Aug. 4, 1942.  H. C. GUHL  2,292,118
MOLDED ARTICLE
Filed July 24, 1940  2 Sheets-Sheet 1
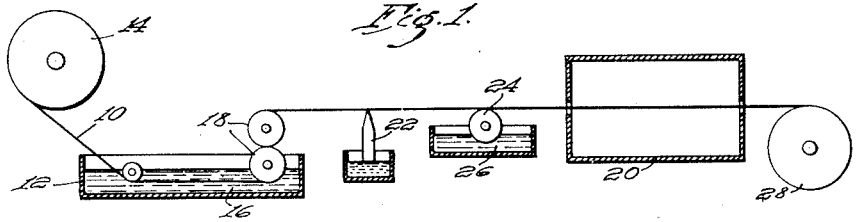
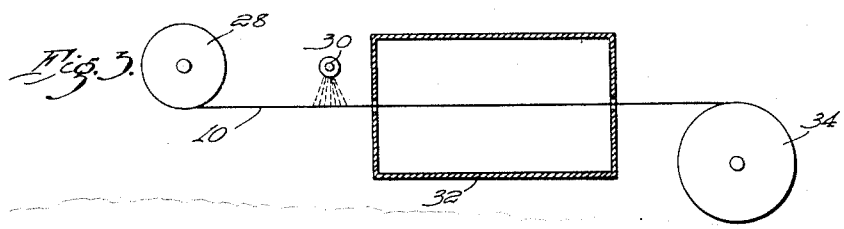
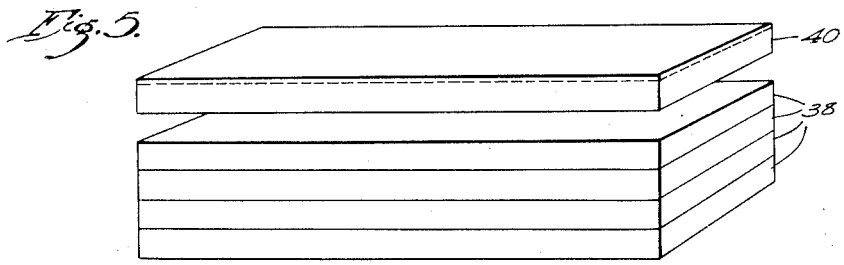
WITNESSES:  INVENTOR
Henry C. Guhl.
BY
ATTORNEY Aug. 4, 1942.   H. C. GUHL   2,292,118
MOLDED ARTICLE
Filed July 24, 1940   2 Sheets-Sheet 2

Patented Aug. 4, 1942

2,292,118

UNITED STATES PATENT OFFICE 2,292,118

MOLDED ARTICLE

Henry C. Guhl, Wilkinsburg, Pa., assignor to Westinghouse Electric & Manufacturing Company, East Pittsburgh, Pa., a corporation of Pennsylvania Application July 24, 1940, Serial No. 347,233

7 Claims. (Cl. 154—43)

This invention relates to molded articles and, in particular, to improved laminated molded articles.

In molding laminated articles from sheets of fibrous material impregnated with or carrying different resins, it has been found to be difficult to obtain a good bond between the different laminations and the different resins. Further, where it is desired to provide a molded article with a predetermined uniformly colored surface, it has been difficult to obtain such surface because of the inherent color of the resins employed and because of the failure to secure a uniform distribution of coloring pigment in the surface coating.

An object of this invention is to provide an improved product having a surface covering, or surface sheet, employing therein resins of different types which are thoroughly bonded together, the resulting product having predetermined warpage characteristics.

Other objects of this invention will become apparent from the following description when taken in conjunction with the accompanying drawings, in which:

Figure 1 is a schematic view of apparatus employed in this invention for impregnating fibrous material in a predetermined manner;

Fig. 2 is a view in side elevation and greatly exaggerated of the sheet of fibrous material after it has been subjected to the treatment as illustrated in Fig. 1;

Fig. 3 is a schematic view of apparatus employed in another step of the process for producing the article of this invention;

Fig. 4 is a view in side elevation and greatly exaggerated of the fibrous material after it has been treated in accordance with a step of the process of Fig. 3;

Fig. 5 is an exploded view in perspective of stacked laminateed material forming the article of this invention;

Figure 6:
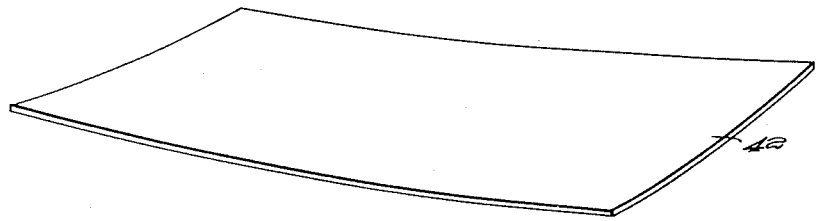
Fig. 6 is a view in perspective of the molded article of this invention.

In producing the article of this invention, it is desired to employ fibrous material impregnated in a predetermined manner with different types of resinous binders. Referring to Fig. 1 of the drawings, there is illustrated the apparatus employed in producing what will herein after be referred to as the surface sheet of the molded article of this invention. As illustrated, a continuous strip 10 of fibrous material, such as paper of the wood base type, for example, alpha pulp, is delivered to a tank 12 from a source of supply 14. The tank 12 contains a resinous solution 16 of the phenolic condensation type in which the strip 10 is immersed. This particular phenolic condensation resin is an odorless fast-setting resin, and although it may be of any of the known phenolic condensation resins, it is preferably of the phenolic type disclosed and claimed in the copending application of W. C. Weltman, Serial No. 347,112, filed July 24, 1940, and assigned to the same assignee as this invention.

After passing through the bath 16 of phenolic condensation resin, the strip 10 is passed between pressure rolls 18, after which it is delivered to a drying and treating oven 20 for partially polymerizing the resin in the sheet. In passing from the pressure rolls 18 to the oven 20, the impregnated strip 10 is passed over a scraper 22 which removes excess phenolic resin from the one side of the strip as illustrated, the strip being then passed over a roll 24 which rotates in a bath 26 of a suitable solvent such as alcohol, the roll 24 being in wiping contact with the surface of the strip 10 which has already been scraped. This wiping contact of the roll 24 carries the solvent to the lower surface of the strip 10 where it functions to dissolve and substantially remove the phenolic condensation resin which would otherwise be present on the one surface of the impregnated strip 10. After the strip is heated to partially polymerize the resin, it is wound into a roll 28. The combination of the scraper and the wiper action, together with the immediate heating in the drying oven 20 produces a strip 10 of fibrous material so impregnated with a phenolic condensation resin which is partially polymerized as to have one of its surfaces substantially free from the impregnating resin, as illustrated in Fig. 2.

In order to provide a suitable surface coating on the treated strip 10, it has been found desirable to employ urea resin as the surface coating. Urea resin, however, of itself does not have sufficient strength nor does it usually have the color which is demanded in commercially sold articles. In order to increase the strength of the resin and to give a coating which will be resistant to checking, it has been found desirable to add a predetermined quantity of paper fiber to the urea resin, the paper fibers having a size of between .1 and .8 m.m. in length and an average diameter of about .01 m.m. The size of the fibers have a definite effect on the flow characteristics of the coating. If the fibers are longer than .8 m.m. the flow of the resin will become non-uniform and result in lowered surface gloss in the molded article whereas if the fibers are shorter than .1 m.m. the gloss may be satisfactory but the resin flow is such as to lose continuity of the surface film and the fibrous material of the surface sheet shows through the film. Usually the paper fibers are mixed with powdered urea resin which has been partially polymerized so as to have low flow characteristics and the resulting mixture is carried in liquid urea resin.

In order to secure a predetermined color in the resulting surface coating, a suitable pigment, depending upon the color desired, is added to the mixture of paper fibers, resin powders and liquid resin in predetermined proportions. For certain applications, such as the refrigerator industry where a white color is desired, zinc sulphide is employed in the liquid resin for securing a uniform white color in the resulting surface coating. The zinc sulphide is very resistant to and maintains its color under ultraviolet light rays and is chemically inert under all manufacturing conditions and service to the resin of the coating. Further, the zinc sulphide is readily wettable by the liquid resin, and its solvents, alcohol and water, thereby enabling the securing of a uniform dispersion of the pigment throughout the coating composition. In addition, the zinc sulphide is readily wettable by the resin during its polymerization and cooperates with the resin to give a finished surface which is resistant to rubbing and loss of color.

In practice it is desired to employ zinc sulphide having a fineness of 325 mesh with the other constituents of the surface coating. In production it has been found desirable to utilize a surface coating composed of approximately 8 parts of pigment, about 22 parts by weight of the resinous powder having a fineness of about 200 mesh, about 17 parts by weight of liquid resin, and about 53 parts by weight of solvent. This preferred coating is applied to the strip 10 of pre-treated fibrous material, as illustrated in Fig. 3 of the drawings.

In this phase of the manufacture of the article of this invention, the roll 28 of pre-treated fibrous material which is so impregnated with the phenolic condensation resin as to have one of its surfaces substantially free from the impregnating resin is so associated with a sprayer 30 that the strip 10 is passed under the sprayer with its surface which is substantially free from the phenolic condensation resin facing the sprayer for receiving the sprayed urea surface coating as illustrated. After the surface coating has been applied to the strip 10 of fibrous material, the strip is passed through a drying and treating oven 32 where the urea coating is partially polymerized, after which the strip may be wound into a roll 34 or can be severed into sheets of predetermined size.

In impregnating the strip 10 of fibrous material with the phenolic condensation resin, the resin applied to the strip is so controlled by means of the squeezer rolls 18, the scraper 22 and the wiper 24, as illustrated in Fig. 1, that the phenolic resin content has a critical ratio of from 1.5 to 1.7. This critical ratio and the term "resin content" as used in the claims is a measure of the resin content of the impregnated strip obtained by dividing the weight of the impregnated article by the weight of the paper in the article.

If the ratio of the phenolic resin content in the strip 10 is more than 1.7, it is found that the characteristic color of the phenol resin will penetrate the urea coating applied as in Fig. 3, whereas if the ratio of the resin content is below 1.5, the surface sheet will not be sufficiently resistant to moisture nor will it have satisfactory bonding characteristics for bonding with a base material, as described hereinafter. With the resin content so controlled as to have a critical ratio of 1.5 to 1.7, a satisfactory bonding of the urea coating as applied in Fig. 3 is obtained, it being found that the urea resin impregnates the phenolic treated strip 10 to a slight degree, as illustrated in Fig. 4, in which the coating 36 is shown as penetrating the strip 10 of fibrous material.

The coating 36 applied to the strip or sheet 10 is found by analyses to comprise about 60.2% of resin, about 19% of fiber, and about 20.8% of pigment. The amount of the surface coating 36 applied to the pre-treated surface sheet or strip 10 is so controlled that the combined phenolic and urea resin content of the surface sheet is a ratio between 1.8 and 2.2, the purpose of which will be described hereinafter. In practice it is desirable that the urea resin coating carrying the pigment be between 3 to 5 mils thick. If the coating is less than 3 mils thick, the characteristic color of the phenolic resin carried by the strip will penetrate the surface coating whereas if it is thicker than 5 mils, the resistance to crazing is reduced and the intensity of color is increased.

In producing the article of this invention, it is desired to employ a base portion comprising laminated sheets 38, as ilustrated in Fig. 5, of fibrous material impregnated with a phenolic condensation resin, the fibrous material preferred being kraft paper. It is preferred to impregnate the sheets 38 of kraft paper with the same type of phenolic condensation resin employed in impregnating the strip 10 which is utilized as the surface sheet 40 of the assembly illustrated in Fig. 5.

Figure 7:
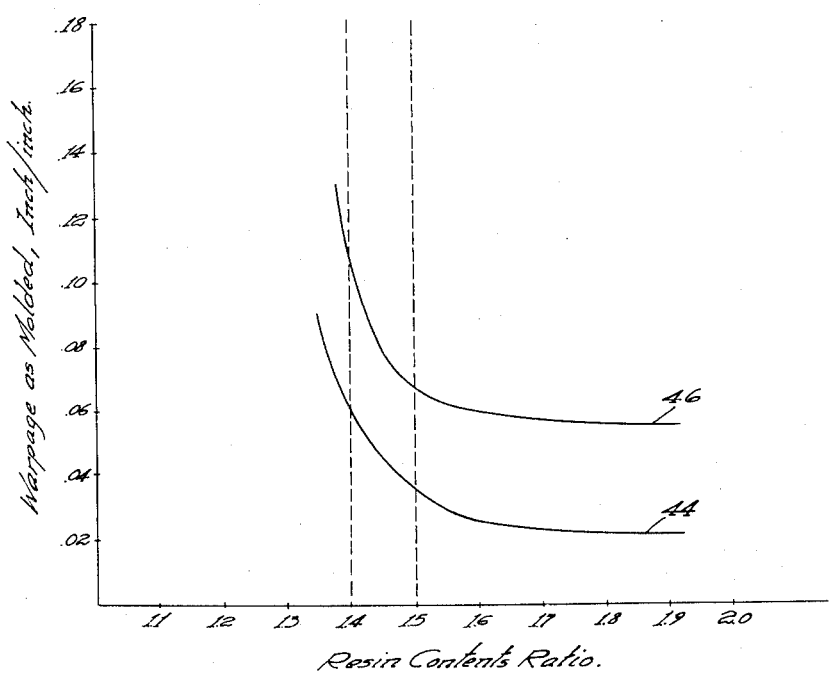
Fig. 7 is a graph, the curves of which illustrate the warpage as molded for different resin contents of the base material of the article shown in Fig. 6.

In impregnating the sheets 38 of the base portion it is desired to so control the resin content of the base portion that the ratio of the resin content of the built-up base portion is between 1.4 and 1.5. With the resin content of the base portion having a ratio of between 1.4 and 1.5 and the combined phenolic and urea resin contents of the surface sheet 40 having a ratio between 1.8 and 2.2, it is found that the article 42 as illustrated in Fig. 6, produced by consolidating the stacked laminated sheets of Fig. 5 under heat and pressure for a period of time sufficient to complete the polymerization of the resin carried by the base portion and the surface sheet will have a predetermined warpage of between .06 and .035 inch per inch with the grain and between .105 and .067 inch per inch across the grain of the sheets of fibrous material, as illustrated in Fig. 7. In practice, a molding temperature of about 140° C. for a period of time of about 50 minutes at a pressure of 1500 pounds per square inch is satisfactory for producing the molded article of Fig. 6.

Referring to Fig. 7, the curves 44 and 46 are representative of the warpage secured in molded laminated articles of this invention having a thickness ranging from $\frac{1}{16}$" to $\frac{3}{32}$" for different resin content ratios of the base portion when the surface sheet has a combined phenolic and urea resin content ratio of between 1.8 and 2.2. In the drawings, curve 44 is illustrative of the warpage secured on a molded article with the sheets stacked and so disposed as to have the grain of the laminated fibrous sheets in the same direction, while curve 46 is illustrative of the warpage secured across the grain of the consolidated laminated fibrous material. In molding the laminated article, it is found that kraft paper in combination with the bonding resin, aids in producing the warpage characteristics since the shrinkage characteristics of the combination of kraft paper and its binder are less than the shrinkage characteristics of the combination of alpha pulp paper and its binder employed as the surface sheet.

The molded article illustrated in Fig. 6 and having the warpage characteristic referred to has found particular use as the inside panel for refrigerator doors, the warpage given to the molded article aiding in holding and maintaining the insulation normally disposed between the inside panel and the outside panel of the door in position. Further, the molded article produced in accordance with this invention is substantially odorless and by reason of the zinc sulphide employed in the urea surface coating has a substantially uniform white color, the urea resin itself, when completely polymerized, giving a surface coating which is resistant to fruit and food acids and alkalis, while at the same time having a resistance to scratch comparable to that of window glass, as tested by the loss of gloss under the influence of carborundum applied to the surface.

Although this invention has been described with reference to a particular embodiment thereof, it is, of course, not to be limited thereto except insofar as is necessitated by the scope of the appended claims.

I claim as my invention:

1. A molded article comprising, a base portion composed of laminated sheets of cellulosic fibrous material having a predetermined grain and impregnated with a phenolic condensation resin, a surface sheet of cellulosic fibrous material having a predetermined grain and so impregnated with phenolic condensation resin as to have one of its surfaces substantially free from the impregnating resin, the phenolic resin content of the surface sheet being a ratio between 1.5 and 1.7, and a coating of urea resin carried by and penetrating the surface of the surface sheet which is substantially free from the phenolic condensation resin, the sheets of the base portion and the surface sheet being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

2. A molded article comprising a base portion composed of laminated sheets of cellulosic fibrous material having a predetermined grain and impregnated with a phenolic condensation resin, a surface sheet of cellulosic fibrous material having a predetermined grain and so impregnated with a phenolic condensation resin as to have one of its surfaces substantially free from the impregnating resin, and a coating comprising urea resin, paper fiber having an average diameter of about .01 m.m. and a length ranging between 0.1 m.m. and 0.8 m.m. and a coloring pigment chemically inert to the resin, carried by the surface of the surface sheet which is substantially free from the phenolic condensation resin, the urea resin of the coating penetrating said surface of the surface sheet, the sheets of the base portion and the surface sheet being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

3. A molded article comprising a base portion composed of laminated sheets of cellulosic fibrous material having a predetermined grain and impregnated with a phenolic condensation resin, a surface sheet of cellulosic fibrous material having a predetermined grain and so impregnated with a phenolic condensation resin as to have one of its surfaces substantially free from the impregnating resin, the phenolic resin content of the surface sheet being a ratio between 1.5 and 1.7, and a coating comprising urea resin, paper fiber having an average diameter of about .01 m.m. and a length ranging between 0.1 m.m. and 0.8 m.m. and a coloring pigment chemically inert to the resin, carried by the surface of the surface sheet which is substantially free from the phenolic condensation resin, the urea resin of the coating penetrating said surface of the surface sheet, the sheets of the base portion and the surface sheet being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

4. A molded article comprising a base portion composed of laminated sheets of cellulosic fibrous material having a predetermined grain and impregnated with a phenolic condensation resin, a surface sheet of cellulosic fibrous material having a predetermined grain and so impregnated with a phenolic condensation resin as to have one of its surfaces substantially free from the impregnating resin, and a coating comprising urea resin, paper fiber having an average diameter of about .01 m.m. and a length ranging between 0.1 m.m. and 0.8 m.m. and zinc sulphide carried by the surface of the surface sheet which is substantially free from the phenolic condensation resin, the urea resin of the coating penetrating said surface of the surface sheet, the sheets of the base portion and the surface sheet being stacked with their grain in the same direction, the base portion, surface sheet and coating being consolidated under heat and pressure into an integral unit, the coated surface of which has a uniform white color, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

5. A molded article comprising, a base portion composed of laminated sheets of cellulosic fibrous material having a predetermined grain and impregnated with a phenolic condensation resin, a surface sheet of cellulosic fibrous material having a predetermined grain and so impregnated with a phenolic condensation resin as to have one of its surfaces substantially free from the impregnating resin, and a coating comprising about 60.2% of urea resin, 19% of paper fiber having an average diameter of about .01 m.m. and a length ranging between 0.1 m.m. and 0.8 m.m. and about 20.8% of zinc sulphide, carried by the surface of the surface sheet which is substantially free from the phenolic condensation resin, the urea resin of the coating penetrating said surface of the surface sheet, the sheets of the base portion and the surface sheet being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

6. A molded article comprising a base portion composed of laminated sheets of cellulosic fibrous material having a predetermined grain and impregnated with a phenolic condensation resin, a surface sheet of cellulosic fibrous material having a predetermined grain and so impregnated with a phenolic condensation resin as to have one of its surfaces substantially free from the impregnating resin, and a coating of urea resin carried by and penetrating the surface of the surface sheet which is substantially free from the phenolic condensation resin, the sheets of fibrous material being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

7. A molded article comprising a base portion composed of laminated sheets of kraft paper having a predetermined grain and impregnated with a phenolic condensation resin, a surface sheet of alpha pulp paper having a predetermined grain and so impregnated with a phenolic condensation resin as to have one of its surfaces substantially free from the impregnating resin, and a coating of urea resin carried by and penetrating the surface of the alpha pulp paper which is substantially free from the phenolic condensation resin, the kraft paper and the alpha pulp paper sheets being stacked with their grain in the same direction, the base portion, surface sheet and coating being consolidated under heat and pressure into an integral unit, the resin content of the base portion being a ratio between 1.4 and 1.5 when the combined phenolic and urea resin content of the surface sheet is a ratio between 1.8 and 2.2 to give the molded unit a predetermined warpage of between .06 and .035 inch per inch with the grain of the sheets and between .105 and .067 inch per inch across the grain of the sheets.

HENRY C. GUHL.